United States Patent [19]

Parton et al.

[11] Patent Number: 5,492,802
[45] Date of Patent: * Feb. 20, 1996

[54] DYE COMPOUNDS AND PHOTOGRAPHIC ELEMENTS CONTAINING SUCH DYES

[75] Inventors: Richard L. Parton, Webster; David A. Stegman, Churchville, both of N.Y.

[73] Assignee: Eastman Kodak Company, Rochester, N.Y.

[*] Notice: The portion of the term of this patent subsequent to May 31, 2011, has been disclaimed.

[21] Appl. No.: 246,390

[22] Filed: May 20, 1994

Related U.S. Application Data

[63] Continuation of Ser. No. 978,567, Nov. 19, 1992, abandoned.

[51] Int. Cl.⁶ ................................................. G03C 1/14
[52] U.S. Cl. ........................ 430/582; 430/567; 430/583; 430/584; 430/586; 430/587; 430/588
[58] Field of Search .................................... 430/567, 582, 430/583, 584, 586, 587, 588

[56] References Cited

U.S. PATENT DOCUMENTS

| | | | |
|---|---|---|---|
| 3,397,060 | 8/1968 | Schwan et al. | 96/104 |
| 3,557,101 | 1/1971 | Taber et al. | 260/240.1 |
| 3,764,340 | 10/1973 | Skiba et al. | 96/124 |
| 3,770,449 | 11/1973 | Shiba et al. | 96/124 |
| 3,832,189 | 8/1974 | Shiba et al. | 96/124 |
| 3,865,598 | 2/1975 | Shiba et al. | 96/125 |
| 3,918,977 | 11/1975 | Sato et al. | 96/137 |
| 4,152,163 | 5/1979 | Sato et al. | 96/124 |
| 4,434,226 | 2/1984 | Wilgus et al. | 430/567 |
| 4,469,780 | 9/1984 | Hirai et al. | 430/373 |
| 4,530,899 | 7/1985 | Ohki et al. | 430/551 |
| 4,546,074 | 10/1985 | Kamei et al. | 430/573 |
| 4,555,482 | 11/1985 | Inoue et al. | 430/574 |
| 4,659,654 | 4/1987 | Metoki et al. | 430/567 |
| 4,689,292 | 8/1987 | Metoki et al. | 430/567 |
| 4,704,351 | 11/1987 | Takiguchi et al. | 430/567 |
| 4,777,125 | 10/1988 | Delfino et al. | 430/567 |
| 4,800,154 | 1/1989 | Okazaki et al. | 430/583 |
| 4,820,606 | 4/1989 | Miyasaka et al. | 430/139 |
| 4,873,179 | 10/1989 | Abe et al. | 430/381 |
| 4,894,323 | 1/1990 | Kawai et al. | 430/569 |
| 4,895,786 | 1/1990 | Kurematau et al. | 430/139 |
| 4,925,780 | 5/1990 | Toshizawa et al. | 430/583 |
| 4,956,263 | 9/1990 | Ishigaki et al. | 430/264 |
| 4,963,476 | 10/1990 | Sugimoto et al. | 430/574 |
| 4,965,170 | 10/1990 | Ukai et al. | 430/264 |
| 5,006,455 | 4/1991 | Patzold et al. | 430/571 |
| 5,008,181 | 4/1991 | Ikegawa et al. | 430/572 |
| 5,032,500 | 7/1991 | Ikeda et al. | 430/583 |
| 5,041,366 | 8/1991 | Asano et al. | 430/567 |
| 5,075,198 | 12/1991 | Katoh | 430/264 |
| 5,091,298 | 2/1992 | Parton et al. | 430/570 |
| 5,093,222 | 3/1992 | Katoh | 430/264 |
| 5,108,888 | 4/1992 | Ikegawa et al. | 430/570 |
| 5,135,845 | 8/1992 | MacIntyre et al. | 430/585 |
| 5,316,904 | 5/1994 | Parton et al. | 430/583 |

FOREIGN PATENT DOCUMENTS

| | | | |
|---|---|---|---|
| 0264788 | 4/1988 | European Pat. Off. | G03C 5/02 |
| 0317886 | 11/1988 | European Pat. Off. | |
| 0358187 | 9/1989 | European Pat. Off. | |
| 0447138 | 3/1991 | European Pat. Off. | |
| 0451816 | 4/1991 | European Pat. Off. | |
| 439356 | 7/1991 | European Pat. Off. | 430/584 |
| 0474047 | 3/1992 | European Pat. Off. | |
| 1480882 | 5/1966 | France . | |
| 2108527 | 5/1972 | France . | |
| 1063028 | 8/1959 | Germany . | |
| 5977435 | 5/1984 | Japan | 430/588 |

OTHER PUBLICATIONS

Abstract of Japanese Patent 03/211545.
JP 1158–436–A (Abstract).
JP 1252–545–A (Abstract).
JP 2167–539–A (Abstract).
JP 2167–539–A (Abstract).
JP 2302–752–A (Abstract).
JP 3054–549–A (Abstract).
JP 3096–651–A (Abstract).
JP 3133–146–A (Abstract).
JP 3184–754–A (Abstract).
JP 4009–040–A (Abstract).
Research Disclosure, Decc. 1989; p. 995.

Primary Examiner—Janet C. Baxter
Attorney, Agent, or Firm—Gordon M. Stewart

[57] ABSTRACT

A silver halide photographic element comprising a sensitizing dye of the formula:

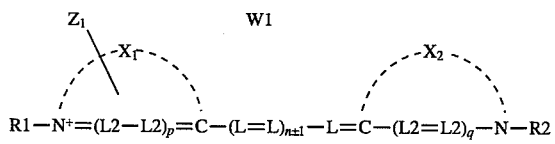

wherein:

X1, X2, n, L, L2, R1 and R2 are as defined in the specification;

Z1 represents Ar1-(L1) m, where Ar1 is a substituted or unsubstituted aromatic group, L1 is a linking group, m is 0 or 1, and the LOGP(A) of a molecule having a structure A corresponding to a portion of the dye structure A

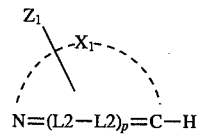

is no more than 90% of LOGP(A'), where A' is the same as A except Z1 is replaced with unsubstituted phenyl, provided that L1 is not —CO— when X1 or X2 is S or Se; and W1 is a counterion as needed to balance the charge of the molecule.

31 Claims, No Drawings

DYE COMPOUNDS AND PHOTOGRAPHIC ELEMENTS CONTAINING SUCH DYES

This is a Continuation of application Ser. No. U.S. Pat. No. 978,567, filed Nov. 19, 1992, now abandoned.

FIELD OF THE INVENTION

This invention relates to particular classes of dyes and photographic elements containing such dyes as sensitizing dyes, as well as a method of screening dyes for those which may be useful as sensitizing dyes.

BACKGROUND OF THE INVENTION

Silver halide photography usually involves the exposure of silver halide photographic element with light in order to form a latent image that is developed during photographic processing to form a visible image. Silver halide is intrinsically sensitive only to light in the blue region of the spectrum. In order to sensitize the silver halide to other than the blue region, sensitizing dyes are used in the silver halide emulsion. Sensitizing dyes are chromophoric compounds (usually cyanine dye compounds). Their usual function is to adsorb to the silver halide and to absorb light (usually other than blue light) and transfer that energy via an electron to the silver halide grain thus, rendering the silver halide sensitive to radiation of a wavelength other than the blue intrinsic sensitivity. However, sensitizing dyes can also be used to augment the sensitivity of silver halide in the blue region of the spectrum.

Generally a sensitizing dye should wash out of the film or paper during processing. Any retained dye contributes to Dmin and this is often referred to as sensitizing dye stain. Dye stain, which adversely affects the image recorded in the photographic material, has been a source of concern for many years. The problem of retained sensitizing dye stain has been aggravated by the advent of new emulsions, such as tabular grains, which have more surface area and use higher dye levels and accordingly tend to give higher levels of dye stain. Additionally, the use of high chloride emulsions makes preferable the use of sensitizing dyes having enhanced adsorption to silver halide since sensitizing dyes tend to be inherently less well adsorbed to silver chloride emulsions. This can also lead to higher levels of dye stain. Such high chloride emulsions are also often subjected to rapid processing, which can further aggravate the stain problems.

In order to reduce dye stain, stain-reducing agents, such as bis-triazine stilbene compounds, also known as optical brighteners, have been used to reduce dye stain. These compounds, however, are expensive and can be difficult to incorporate in the hydrophilic layers of photographic materials. Another method for reducing dye stain in some cases, is to incorporate certain substituents into the dye molecule to reduce dye stain. For example, dyes containing N,N'-2-hydroxy- 3-sulfopropyl nitrogen substituents (U.S. Pat. No. 3,424,586) are generally less retained than the corresponding dyes with 3-sulfopropyl groups. Other stain-reducing nitrogen substituents have also been disclosed such as the 2-sulfoethylcarbamoylmethyl groups disclosed in U.S. Pat. No. 5,091,298.

Although the foregoing dye structure modifications can be effective at reducing dye stain they have not eliminated the problem. New substituents are always desirable which will result in dyes with low dye stain. In addition, there is an important class of green sensitizers for which it is not possible to use these types of stain-reducing nitrogen substituents. In particular, benzoxazole dyes (an example is given in Formula A below) are commonly used to afford green sensitization in many photographic products such as color negative and reversal films, and color paper.

Formula A

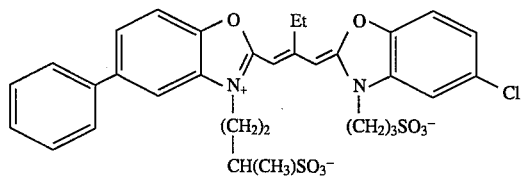

In many instances, benzoxazole dues also produce undesirable post-process stain. However, it has not been possible to incorporate the aforementioned stain-reducing nitrogen substituents on these dyes because the benzoxazole nucleus is too reactive. For instance, attempts to place a 2-hydroxy-3-sulfopropyl substituent, a 2-sulfoethylcarbamoylmethyl or similar group on the benzoxazole nucleus result in ring-opening of the benzoxazole. Thus, alternative stain reducing substituents are especially needed for dyes containing the benzoxazole nucleus.

Many patents disclose a variety of substituents on cyanine type dyes, including the fused back benzyl or napthyl rings of such dyes. For example, see U.S. Pat. No. 5,108,888, U.S. Pat. Nos. 5,093,222, 5,091,128 where the back ring substituents shown include phenyl groups directly bonded to the back ring. U.S. Pat. No. 3,764,340 shows cyanine type dyes with various back ring substituents including a benzyl group linked through a carbonyl group to the back ring. However, the patent specifically requires that the dye have a nucleus selected from benzothiazole, napthothiazole or benzoselenazole only. However, U.S. Pat. No. 4,965,170 and U.S. Pat. No. 5,008,181 both disclose cyanine type dyes with phenylene substituents bonded to a back ring through long linking chains. The compounds are intended to be light collecting dyes which are immobile due to the substituents but which are either oxidized during processing or are expressly only weakly adsorbed to silver halide.

It is thus an object of this invention to provide new dye compounds useful as sensitizing dyes for silver halide photographic elements, which dyes have relatively low dye stain. It is a further object of this invention to provide new benzoxazole sensitizers which exhibit relatively low dye stain, and to provide a method of screening sensitizing dyes for those which may produce only relatively low dye stain.

SUMMARY OF THE INVENTION

The present invention provides ,dye compounds and silver halide photographic elements containing them as sensitizing dyes, which have the formula of structure I below. Such dye compounds tend to exhibit lower stain, particularly in a color format, than corresponding dyes without the particular back ring substituents required by the present invention dyes.

structure I

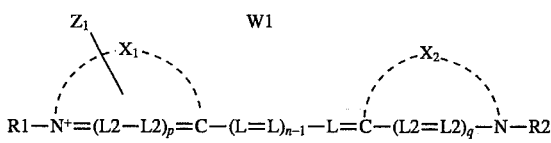

$$R1-N^+=(L2-L2)_p=C-(L=L)_{n-1}-L=C-(L2=L2)_q-N-R2 \quad W1$$

wherein:

X1 and X2 each independently represents the atoms necessary to complete a 5- or 6-membered heterocyclic nucleus, wherein X1 may be further substituted and X2 may be substituted or unsubstituted;

n is a positive integer from 1 to 4;

p and q each independently represents 0 or 1, each L and L2 independently represents a substituted or unsubstituted methine group, R1 and R2 each independently represents substituted or unsubstituted aryl or substituted or unsubstituted aliphatic groups;

Z1 represents Ar1-(L1)m-, where Ar1 is a substituted or unsubstituted aromatic group, L1 is a linking group, m is 0 or 1, and the LOGP(A) of a molecule having a structure A corresponding to a portion of the dye structure A

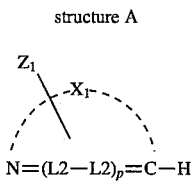

$$N=(L2-L2)_p=C-H$$

is no more than 90% of LOGP(A'), where A' is the same as A except Z1 is replaced with unsubstituted phenyl, provided that L1 is not —CO— if either or both of X1 or X2 is S or Se; and W1 is a counterion as needed to balance the charge of the molecule.

In the above, LOGP is a measured octanol/water partition coefficient. CLOGP is a calculated value of the foregoing coefficient. Therefore, wherever a LOGP value is discussed in this application with reference to the present invention, the corresponding CLOGP value can be used as the LOGP value. Methods for determining CLOGP are described later.

The present invention further provides a method of screening silver halide sensitizing dyes of the above structure I type, which method comprises calculating a CLOGP(A) of a molecule having a structure A corresponding to a portion of the dye. Then, the stain produced by the dye in a photographic environment is tested only if the CLOGP(A) is less than LOGP(A') or CLOGP(A'), where structures A and A' are as defined above. By testing the dye in a "photographic environment" in the foregoing context, is meant testing it in a medium of a photographic element which includes those substances which might be expected to be involved in the amount of dye stain produced. For example, normally this would mean a test in a silver halide containing gelatin layer preferably containing at least a color coupler dispersion.

DETAILED DESCRIPTION OF EMBODIMENTS OF THE INVENTION

Examples of X1 and X2 in the above formula, include benzothiazole nucleus, benzoxazole nucleus, benzoselenazole nucleus, benzotellurazole nucleus, quinoline nucleus, benzimidazole nucleus, thiazoline nucleus, indoline nucleus, oxadiazole nucleus, thiadiazole nucleus, or imidazole nucleus. In particular, X1 and X2 may be both oxaxole rings. Substituents which may be present on X1 and/or X2 include halogen (e.g., chloro, fluoro, bromo), alkoxy (e.g. methoxy, ethoxy), substituted or unsubstituted alkyl (e.g. methyl, trifluoromethyl), and others. Examples of substituents on the methine groups, L or L2 include alkyl (preferably of from 1 to 6 carbon atoms, e.g. methyl, ethyl, etc.) and aryl (e.g. phenyl). Additionally, substituents on the methine groups may form bridged linkages. It is preferred that other than Z1, any other substituents on both nucleii be non-aromatic, unless R1 and R2 are both 2-sulfoethyl, otherwise, a higher dye stain may be produced.

Counterions represented by W1 are well-known in the art, and can include sodium, potassium, triethylammonium, and the like. When R1 or R2 represents a substituted or unsubstituted aryl, preferably it has from 6 to 15 carbon atoms. More preferably, though, at least one and preferably each of, R1 and R2, is a substituted or unsubstituted alkyl (preferably of from 1 to 6 carbon atoms). Preferably one, or more preferably both, R1 and R2 have an acid or acid salt group such as sulfo or —$CH_2$—CO—NH—$SO_2$—$CH_3$—. Examples of aryl include phenyl, tolyl, and the like. Examples of alkyl include methyl, ethyl, propyl, and the like, and substituted alkyl groups (preferably a substituted lower alkyl containing from 1 to 6 carbon atoms) such as hydroxyalkyl group, e.g. 2-hydroxyethyl; a sulfoalkyl group, e.g., 2sulfobutyl, 3-sulfopropyl, etc. The alkyl or aryl group may be substitutedby one or more of the substituents on the above-described nucleii.

Ar1 in Z1 is a substituted or unsubstituted aromatic group. The definition of aromatic rings is described in J. March, *Advanced Organic Chemistry*, Chapter 2, (1985), John Wiley & Sons, New York). The aromatic group can be a hydrocarbon or heterocyclic. Examples of unsubstituted aromatic groups are phenyl, thiophene, furan, and pyrrole, etc. L1 and any substituents on Ar1 preferably maintain the relatively planar shape of Ar1-(L1)m-nucleus- portion of the dye molecule. Examples of such substituents include halogen, alkyl (where methyl is preferred over ethyl), alkoxy (for example, methoxy), amides (for example, methylcarboxamido) and the like. Preferably substituents on Ar1 should not be charged (for example, a sulfo group on Ar1 would be less preferred). L1, when present, may have a chain of atoms linking Ar1 with X1, which chain may, for example, be limited in length to no more than 1, 2 or 3 atoms. Furthermore, L1 preferably has a Hammett σ constant which is no more than 0.40 (and may even be 0.30 or less, or 0.20 or less). Hammett σ constants are a known measure of electron withdrawing strength, and can be determined in a known manner (for example, see J. Hine, *Physical Organic Chemistry*, 2nd ed., McGraw-Hill, N.Y., 1962, p. 90, and for Hammett values and a discussion of their meaning see Hansch and Leo, *Substituent Constants for Correlation Analysis in Chemistry and Biology*, John Wiley & Sons, New York 1979).

As described above, the LOGP(A) is no more than 90% of LOGP(A'), and preferably no more than 80% (or even 70%, 60% or 50% or less) of LOGP(A'). The foregoing relative LOGP values may be evaluated using calculated LOGP ("CLOGP") values. CLOGP values are preferably calculated using the commercially available Medchem software package, release 3.54, developed and distributed by Pomona College, Claremont, Calif., or by the methods described in A. Leo and C. Hansch, *Substituent Constants for Correlation Analysis in Chemistry and Biology*, Wiley, N.Y. (1979).

When m in the above formula is 1, the aromatic group is appended directly to the dye molecule. In such case it is preferred that the aromatic group not have substituents, other than hydrogen, α to the point of attachment. For example 3,4-dimethylpyrrole-1-yl would be preferred over 2,5-dimethylpyrrole-1-yl. Substituents α to the point of attachment may cause the aromatic group to rotate out of the plane of the dye molecule and may disrupt dye aggregation resulting in poor sensitization.

The dye of the photographic element may further have a structure such that:

$$[LOGP(A')-LOGP(A)]+[LOGP(B')-LOGP(B)] \geq -0.55$$

Or preferably the above figure is $\geq -0.30$ (or even greater than or equal to $-0.20$, $-0.10$, or 0). In the above LOGP(B) is the LOGP of a molecule having a structure B corresponding to a portion of the dye:

structure B

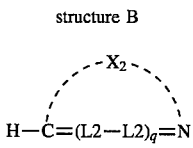

and B' is the same as B except X2 is unsubstituted (thus, if the dye has no substituents on X2 then B and B' are the same). By structures A and B each "corresponding" to a portion of the dye is meant that each has the same structure as a corresponding end of the dye with the exception that in each case, the bond between the ring C and bridging L of the dye has been replaced with a C—H bond and the molecule is neutral.

Sensitizing dyes of general Formula I of the present invention, may particularly be of the type of Structure II below:

Structure II

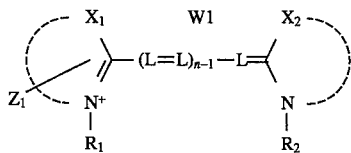

wherein:

X1 and X2 independently represent the atoms necessary to complete a benzothiazole nucleus, benzoxazole nucleus, benzoselenazole nucleus, benzotellurazole nucleus, quinoline nucleus, or benzimidazole nucleus in which X1 may be further substituted and X2 may be substituted or unsubstituted;

n, L, R1, R2, Z1 and W1 are as defined above in connection with Structure I. Note that structures A and B with reference to Structure II, while having the same general formulae as provided above, will specifically be as shown below (that is, q=0 in the case of Structure II):

structure A

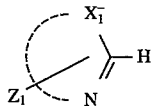

-continued
structure B

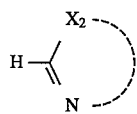

Further, sensitizing dyes of structure I of the present invention may particularly be of Structure III or IV below:

Structure III

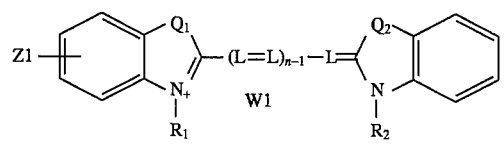

Structure IV

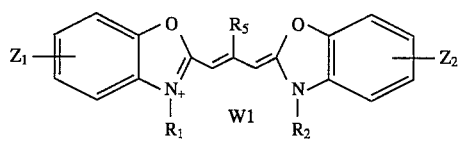

In the above Structure III and IV, Z1, R1, n and W1 are as defined above in connection with Structure I.

In Structure III, while the benzene rings may have substituents in addition to Z1, any such substituents are preferably non-aromatic. Q1 and Q2 independently represent O, N or S. In Structure IV, R5 is a substituted or unsubstituted lower alkyl, or H, and Z2 is H or a non-aromatic substituent. In Structure IV the Z1 and Z2 are preferably on the 5-positions of their respective benzene rings, and Z1 and Z2 may be the only substituents. Note that specific structures A and B for Structure III dyes would be:

structure A

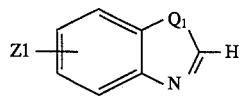

structure B

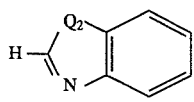

while specific structures A and B for Structure IV dyes would be:

structure A

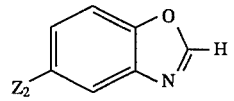

structure B

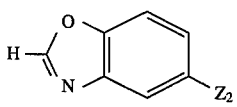

Any of the classes of sensitizing dyes of the present invention and photographic elements containing them, may optionally specifically exclude each or all of the following dye groups:

1) the hydroxyarylacyl substituted dyes of U.S. Pat. No. 5,354,651 "Hydroxyarylacyl Dye Compounds and Silver Halide Photographic Elements Containing Such Dyes";

2) the furan or pyrrole substituted dyes of U.S. Pat. No. 5,418,126 "Furan or Pyrrole Substituted Dye Compounds and Silver Halide Photographic Elements Containing Such Dyes".

3) the amide substituted dyes of U.S. Pat. No. 5,316,904 "Amide Substituted Dye Compounds and Silver Halide Photographic Elements Containing Such Dyes".

All of the above applications are incorporated in the present application by reference.

In one version of the screening method of the present invention, the stain produced by the dye in a photographic environment is tested only if the value of CLOGP(A) is no more than 90% of the LOGP(A') or, more preferably, no more than 90% of the CLOGP(A'). Dyes tested may be further limited to those having a CLOGP(A) no more than 80% (or 70%, 60%, 50% or less) of LOGP(A') or CLOGP(A') (preferably the latter). Further limitations on the screening parameters to obtain a smaller class of dyes for testing, include limiting testing to those dyes having:

[LOGP(A')–LOGP(A)]+[LOGP(B')–LOG](B)|)≧–0.55 or the above figure can be limited to greater than or equal to –0.30 (or –0.20, –0.10, or 0). The dyes screened or tested can be further limited to those having Structure II, III or IV.

Precursors of dyes of Formula I can be made by techniques that are known in the art. For example, reaction of a 5-amino base with an aromatic (B) acid chloride affords an aromatic amide-substituted base.

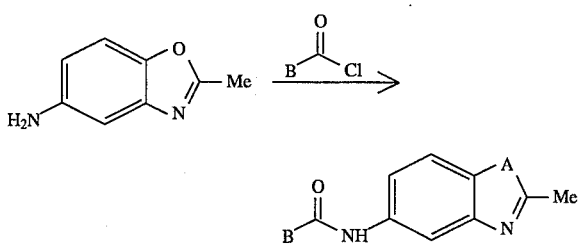

Nitration of an aromatic (Ar) substituted base followed by reduction affords an amine. Reaction with an acid chloride affords an amide-substituted aromatic base.

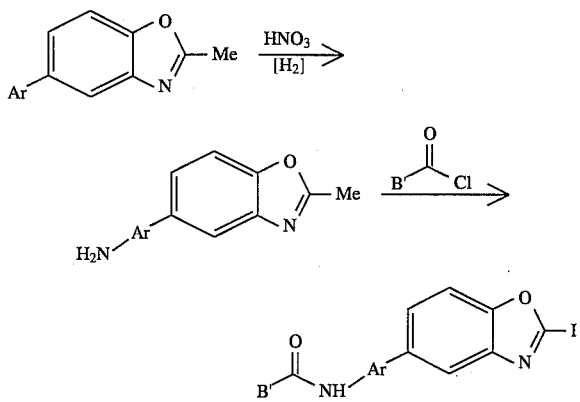

A review of the synthesis of substituted pyrroles is provided by G. P. Bean, *Pyrroles,* R. A. Jones, Ed.,John Wiley & Sons, Inc., New York, 1990, Chapter 2. A review of furan synthesis is provided by F. M. Dean, *Advances in Heterocyclic Chemistry,* A. R. Katritzky, Ed., volume 3.0, Academic Press, New York, 1982, p 167.

A pyrrol-1-yl substituted base can be made by reaction of an amino base with 2,5-dimethoxytetrahydrofuran.

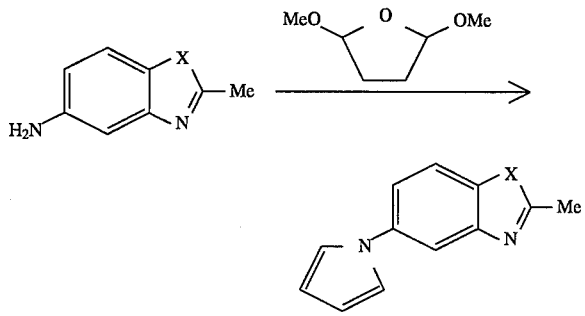

Preparation of a diazonium salt from an aminosubstituted base followed by decomposition in the presence of furan results in formation of the furan-2-yl substituted base.

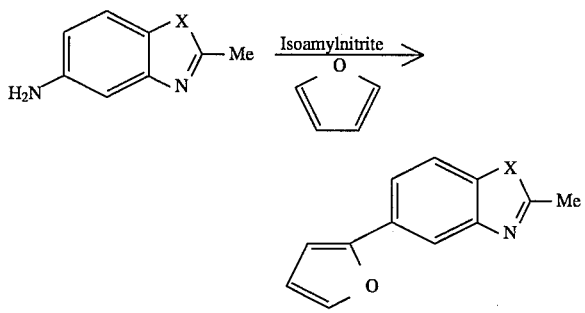

Dyes of formula I can be prepared from the above dye precursors according to techniques that are known in the art, such as described in Hamer, *Cyanine Dyes and Related Compounds,* 1964 and James, *The Theory of the Photographic Process* 4th, 1977.

The amount of sensitizing dye that is useful in the invention is preferably in the range of 0.1 to 4.0 millimoles per mole of silver halide (although more might be used in specific cases) and more preferably from 0.2 to 2.2 millimoles per mole of silver halide. Optimum dye concentrations can be determined by methods known in the art.

The silver halide used in the photographic elements of the present invention may be silver bromoiodide, silver bromide, silver chloride, silver chlorobromide, and the like. The silver halide used in the photographic elements of the present invention preferably contains at least 90% silver chloride or more (for example, at least 95%, 98%, 99% or 100% silver chloride). In particular, the possibility is also contemplated that the silver chloride could be treated with a bromide solution to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The photographic elements of the present invention preferably use the sensitizing dye with tabular grain emulsions. Tabular silver halide grains are grains having two substantially parallel crystal faces that are larger than any other surface on the grain. Tabular grain emulsions are those in which greater than 50 percent of the total projected area of the emulsion grains are accounted for by tabular grains having a thickness of less than 0.3 μm (0.5 μm for blue sensitive emulsion) and an average tabularity (T) of greater than 25 (preferably greater than 100), where the term "tabularity" is employed in its art recognized usage as $$T=ECD/t^2$$

where

ECD is the average equivalent circular diameter of the tabular grains in μm and t is the average thickness in μm of the tabular grains. The grain size of the silver halide may have any distribution known to be useful in photographic compositions, and may be ether polydispersed or monodispersed.

The silver halide grains to be used in the invention may be prepared according to methods known in the art, such as those described in *Research Disclosure*, (Kenneth Mason Publications Ltd, Emsworth, England) Item 308119, December, 1989 (hereinafter referred to as *Research Disclosure I*) and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June 1975, item 13452 and U.S. Pat. No. 3,772,031.

The silver halide may be sensitized by dyes of the present invention by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours). Essentially any type of emulsion (e.g., negative-working emulsions such as surface-sensitive emulsions or unfogged internal latent image-forming emulsions, direct-positive emulsions such as surface fogged emulsions, or others described in, for example, *Research Disclosure I*) may be used. The above-described sensitizing dyes can be used alone, or may be used in combination with other sensitizing dyes, e.g. to also provide the silver halide with sensitivity to wavelengths of light outside the green region or to supersensitize the silver halide.

Other addenda in the emulsion may include antifoggants, stabilizers, filter dyes, light absorbing or reflecting pigments, vehicle hardeners such as gelatin hardeners, coating aids,. dye-forming couplers, and development modifiers such as development inhibitor releasing couplers, timed development inhibitor releasing couplers, ultraviolet absorbers, and bleach accelerators. These addenda and methods of their inclusion in emulsion and other photographic layers are well-known in the art and are disclosed in *Research Disclosure I* and the references cited therein. The emulsion may also include brighteners, such as stilbene brighteners. Such brighteners are well-known in the art and are used to counteract dye stain, although the dyes of the present invention generally have low dye stain even if no brightener is used.

The emulsion layer containing silver halide sensitized with a dye of the present invention can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like. The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements of the present invention can be black and white but are preferably color. A color photographic element generally contains three silver emulsion layers or sets of layers (each set of layers often consisting of emulsions of the same spectral sensitivity but different speed): a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Those dye forming couplers are provided in the emulsion typically by first dissolving or dispersing them in a water immiscible, high boiling point organic solvent, the resulting mixture then being dispersed in the emulsion. Suitable solvents include those in European Patent Application 87119271.2. Dye-forming couplers are well-known in the art and are disclosed, for example, in *Research Disclosure I*

Photographic elements comprising the composition of the invention can be processed in any of a number of well-known photographic processes utilizing any of a number of well-known processing compositions, described, for example, in *Research Disclosure I*, or in James, *The Theory of the Photographic Process* 4th, 1977, or in rapid processing methods such as described in U.S. Pat. No. 4,892,804.

The relationship between the LOGP(A) and LOGP(A') and similarly, LOGP(B) and LOGP(B'), of dyes of Structure I, was determined based on the recognition that one of the major factors which leads to dye retention in color system is interaction of the sensitizing dye with a coupler dispersion during processing. A secondary, but important factor, can be aggregation (or precipitation) of the dye in gelatin during processing. Considering the interaction of sensitizing dye with coupler dispersion, it is possible to view the dispersion as an 'organic' solvent. In this model, as the dye is washing out of the coating, it partitions between coupler dispersion and the aqueous processing solution. Since most dyes in color systems have sulfonate solubilizing groups, it is most likely that the dye only partially partitions into the dispersion and the sulfonate groups remain in the aqueous phase.

This partitioning process was evaluated from the perspective of the dye's hdrophobicity and was modeled by an octanol/water two phase system. Octanol/water partition coefficients (P) are a known measurement of hydrophobicity, that is the tendency of a compound to be partitioned in nonpolar phase versus an aqueous phase of an organic/aqueous mixture. They are derived by mixing a compound with a water and 1-octanol and determining the ratio of the concentration of the compound in octanol to that in water at equilibrium. While LogP is a measure of the hydrophobicity of an entire molecule, the parameter K is the relative hydrophobicity of substituents and is defined, for a substituent X, as $$\pi X = \log P_X - \log P_H$$

where $P_X$ is the partition coefficient of a derivative with substituent X, and $P_H$ that of the parent compound. The $\pi$ parameter is very useful when working with a set of derivatives of a parent compound in which a large portion of the structure remains constant. These parameters are further described by Leo and Hansch, *Substituent Constant for Correlation Analysis in Chemistry and Biology*, Wiley, New York (1979).

It is relatively difficult to measure partition coefficients for cyanine dyes because they readily associate in water forming dimers or higher aggregates and this leads to erroneous logP values. An alternative method of measuring relative logP for compounds is by determining isocratic HPLC retention times which are known to be related to log P values. See, for example, *Journal Medicinal Chemistry*, V. 18, 549 (1975); *Journal Medicinal Chemistry*, V. 19, 615; and *Journal Medicinal Chemistry*, V. 24, 262. We have found that this method works very well for cyanine dyes. If coupler dispersion interactions are the principle cause of dye stain, our model would predict that in a series of dyes, dye stain would decrease as the dyes become less hydrophobic. Thus low staining dyes would have low HPLC retention times which corresponds to low log P values.

However, it would be advantageous if the effect of changes in dye structure on dye stain properties could be predicted before new dyes were synthesized. We have found such effect can be predicted based on the impact a structure change has on the dye's logP. Methods have previously been developed that allow calculation of a logP values for a molecule, refered to as CLOGP. The procedure involves breaking the molecule into fragments and summing the contribution to the calculated log P for each of the fragments along with any interaction terms between fragments. These calculations are relatively simple provided the fragment values are known, and have been further simplified by commercially-available software packages which will calculate log P values upon entering a molecular structure. However, suitable fragment values are not available for a cyanine dye.

In view of the foregoing, a simplified case was examined by first considering the substituents on a molecule of structure A corresponding to a portion of a benzoxazole dye. Calculated LOGP values can be readily obtained for various substituents (X) on structure A using, for example, the Medchem software previously described. Values of a substituent hydrophobicity parameter, $\pi_X$, for substituents X, were determined by calculating CLOGP for the structure A substituted with X and subtracting CLOGP value (1.435) for the parent benzoxazole nucleus (Structure A, X=H). CLOGP values were calculated using the commercially-available Medchem software package, release 3.54, developed and distributed by Pomona College, Claremont, Calif. $\pi$ values can be derived from these CLOGP values. For example, the $\pi_X$ value for a phenyl group (X=C6H5) is equal to CLOGP (5-phenylbenzoxazole)—CLOGP (benzoxazole)=3.32−1.435=1.89.

Structure A

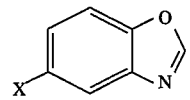

Some particular CLOGP values are provided in Table A below for the molecule shown with various types of X and Y. Each value under "CLOGP Ratio" is the CLOGP for the particular molecule divided by the CLOGP of the same molecule but with X being replaced by phenyl, multiplied by 100, that is:

*CLOGP Ratio=(CLOGP of molecule)/(CLOGP of same molecule but with X=Phenyl)×100*

TABLE A

| X | Y | CLOGPx | CLOGP Ratio |
|---|---|--------|-------------|
| phenyl | O | 3.323 | 100 |
| phenyl | S | 3.919 | 100 |
| phenyl | N—Et | 4.133 | 100 |
| phenyl-CH₂— | O | 3.342 | 101 |

TABLE A-continued
| x | y | ClOgPx | CLOGP Ratio |
|---|---|---|---|
| PhCH₂– | S | 3.948 | 101 |
| PhCH₂– | N–Et | 4.162 | 101 |
| PhC(O)– | O | 2.670 | 80 |
| PhC(O)– | S | 3.276 | 84 |
| PhC(O)– | N–Et | 3.488 | 84 |
| 4-Cl-C₆H₄– | O | 4.036 | 122 |
| 4-Cl-C₆H₄– | S | 4.632 | 118 |
| 4-Cl-C₆H₄– | N–Et | 4.846 | 117 |
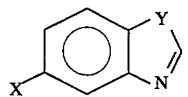
| x | y | ClOgPx | CLOGP Ratio |
|---|---|---|---|
| PhOC(O)– | O | 3.080 | 93 |
| PhOC(O)– | S | 3.686 | 94 |
| PhOC(O)– | N–Et | 3.898 | 94 |
| CH₃C(O)NH-C₆H₄– | O | 2.342 | 71 |
| CH₃C(O)NH-C₆H₄– | S | 2.938 | 75 |
| CH₃C(O)NH-C₆H₄– | N–Et | 3.152 | 76 |
| PhC(O)NH– | O | 2.397 | 72 |
| PhC(O)NH– | S | 2.993 | 76 |
| PhC(O)NH– | N–Et | 3.256 | 77 |
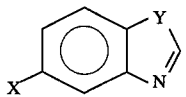
| x | y | ClOgPx | CLOGP Ratio |
|---|---|---|---|
| furyl (O) | O | 2.709 | 82 |
| furyl (O) | S | 3.305 | 84 |
| furyl (O) | N–Et | 3.519 | 85 |
| pyrrolyl (N) | O | 2.149 | 65 |
| pyrrolyl (N) | S | 2.745 | 70 |
| pyrrolyl (N) | N–Et | 2.959 | 72 |
| thienyl (S) | O | 3.179 | 96 |
| thienyl (S) | S | 3.775 | 96 |
| thienyl (S) | N–Et | 3.989 | 97 |
| PhNH– | O | 3.367 | 101 |

TABLE A-continued

| x | | y | ClOgPx | CLOGP Ratio |
|---|---|---|---|---|
| phenyl-NH- | | S | 3.963 | 101 |
| phenyl-NH- | | N—Et | 4.226 | 102 |

Structure: X—CH=CH—Y with N (oxazole/thiazole/imidazole type)

| x | y | ClOgPx | CLOGP Ratio |
|---|---|---|---|
| phenyl- | O | 1.939 | 100 |
| phenyl- | S | 2.535 | 100 |
| phenyl- | N—Et | 2.749 | 100 |
| Cl-phenyl- | O | 2.664 | 1.37 |
| Cl-phenyl- | S | 3.262 | 129 |
| Cl-phenyl- | N—Et | 3.473 | 126 |
| CH₃O-phenyl- | O | 1.949 | 101 |
| CH₃O-phenyl- | S | 2.546 | 100 |
| CH₃O-phenyl- | N—Et | 2.766 | 101 |
| phenyl-C(O)NH- | O | 1.256 | 65 |
| phenyl-C(O)NH- | S | 1.852 | 73 |
| phenyl-C(O)NH- | N—Et | 2.197 | 80 |

Structure: X—CH=CH—Y with N

| x | y | ClOgPx | CLOGP Ratio |
|---|---|---|---|
| furan- | O | 1.325 | 68 |
| furan- | S | 1.921 | 76 |
| furan- | N—Et | 2.135 | 78 |
| pyrrole- | O | 0.899 | 46 |
| pyrrole- | S | 1.495 | 59 |
| pyrrole- | N—Et | 1.721 | 63 |

Structure: benzo-fused X—...—Y—N

| x | y | ClogP |
|---|---|---|
| Cl— | O | 2.177 |
| Cl— | S | 2.779 |
| Cl— | N—Et | 2.986 |
| CH₃— | O | 1.934 |
| CH₃— | S | 2.530 |
| CH₃— | N—Et | 2.744 |
| CH₃CONH— | O | 0.908 |
| CH₃CONH— | S | 1.504 |
| CH₃CONH— | N—Et | 1.767 |
| H— | O | 1.435 |
| H— | S | 2.031 |
| H— | N—Et | 2.245 |
| ClCH₂— | O | 1.997 |
| ClCH₂— | S | 2.593 |
| ClCH₂— | N—Et | 2.807 |

Structure: X—CH=CH—Y with N

| x | y | ClogP |
|---|---|---|
| Cl— | O | 0.613 |
| Cl— | S | 1.219 |
| Cl— | N—Et | 1.421 |
| H— | O | −0.159 |
| H— | S | 0.437 |
| H— | N—Et | 0.651 |

When CLOGP(A) is less than CLOGP(A'), where A' is the same molecule as A except with an unsubstituted phenyl replacing X, the dye stain of a dye with nucleus A is expected to be less than the same dye with nucleus A'. In view of this, CLOGP values of molecules A each corresponding to a portion of the benzoxazole dye shown below in Table IIIA were calculated. In the case of Z1=phenyl, this would represent a molecule A'. Dyes of the present invention would have a CLOGP equal to 3.00 or less (that is, 90% or less of the CLOGP of the phenyl dye).

TABLE IIIA

[Structure II: bis-benzoxazole dye with Z₁, Z₂, R₁, R₂, Et substituents]
[Structure A': benzoxazole with Z₁]

| Z₁ (II) | CLOGP | Z₁ (A') | CLOGP |
|---|---|---|---|
| phenyl (Comparison) | 3.32 | 3-(MeC(=O)NH)-phenyl | 2.34 |
| 2-thienyl (Comparison) | 3.18 | PhNHC(=O)– | 2.28 |
| 3,4-dimethyl-2,5-dioxo-pyrrolin-1-yl (Comparison*) | 1.84 | 2,6-dihydroxy-PhC(=O)NH– | 2.20 |
| 2-furyl | 2.71 | 1H-pyrrol-2-yl (NH) | 2.15 |
| 2-(OH)-PhC(=O)NH– | 2.70 | 2-thienyl-C(=O)NH– | 2.09 |
| PhNH-C(=O)-NH– | 2.64 | 3-(HO)-PhC(=O)NH– | 2.07 |
| pyrrol-1-yl | 2.54 | 2-furyl-C(=O)NH– | 1.57 |
| PhC(=O)NH– | 2.40 | 2-(NH)-pyrrolyl-C(=O)NH– | 1.27 |
| 4-(MeC(=O)NH)-phenyl | 2.34 | | |

*Meets hydrophobicity requirement but has substituents α to the point of attachment.

Examples of compounds according to formula I of the present invention would include those listed in Table IV:

TABLE IV

[Structure: bis-benzoxazole dye with Et bridge, Z1 and Z2 substituents, R1 and R2 on N+]

| Dye | $Z_1$ | $Z_2$ | $R_1, R_2$ [a] |
|---|---|---|---|
| I-1 | [phenyl-C(O)-NH–] | Cl | 3SB, SP |
| I-2 | " | Cl | SP, SP |
| I-3 | " | F | SP, SP |
| I-4 | " | F | 3SB, SP |
| I-5 | " | $=Z_1$ | SE, SE |
| I-6 | [4-(MeC(O)NH)-phenyl–] | Cl | SP, SP |
| I-7 | " | Cl | 3SB, SP |
| I-8 | " | Cl | SE, SP |
| I-9 | " | F | SE, SP |
| I-10 | " | F | SP, SP |
| I-11 | " | $=Z_1$ | SE, SE |
| I-12 | " | Br | SE, SP |
| I-13 | [3-(MeC(O)NH)-phenyl–] | Cl | 3SB, SP |
| I-14 | " | F | 3SB, SP |
| I-15 | " | $=Z_1$ | SE, SE |
| I-16 | [2-OH-phenyl-C(O)-NH–] | Cl | 3SB, SP |
| I-17 | " | Cl | Et, SP |
| I-18 | " | F | 3SB, SP |
| I-19 | " | $=Z_1$ | SE, SE |
| I-20 | [2,6-(OH)$_2$-phenyl-C(O)-NH–] | Cl | 4SB, SP |
| I-21 | [thiophene-2-C(O)-NH–] | Cl | 3SB, SP |
| I-22 | " | $=Z_1$ | SE, SE |
| I-23 | [furan-2-C(O)-NH–] | Cl | 4SB, 4SP |
| I-24 | " | Cl | SP, SP |
| I-25 | " | Cl | Et, SP |
| I-26 | " | F | 4SB, SP |
| I-27 | " | F | SP, SP |
| I-28 | " | F | Et, SP |
| I-29 | " | $=Z_1$ | SE, SE |
| I-30 | " | Br | 4SB, SP |
| I-31 | [pyrrole-2-C(O)-NH–] | Cl | 3SB, SP |
| I-32 | " | Cl | SP, SP |
| I-33 | " | F | 3SB, SP |
| I-34 | " | Br | SP, SP |
| I-36 | " | I | SP, SP |
| I-37 | [phenyl-NHC(O)–] | Cl | SP, SP |
| I-38 | [3-OH-phenyl-C(O)-NH–] | Cl | SP, SP |
| I-41 | [phenyl-C(O)-NH–] | $=Z_1$ | SP, SP |
| I-42 | [furan-2-C(O)-NH–] | $=Z_1$ | SP, SP |
| I-43 | [pyrrol-1-yl–] | Cl | SP, SP |
| I-44 | " | F | SP, SP |
| I-45 | [pyrrol-2-yl(NH)–] | Cl | SP, SP |
| I-46 | " | F | SP, SP |
| I-47 | [furan-2-yl–] | Cl | SP, SP |
| I-48 | " | Cl | SP, SE |
| I-49 | " | F | SP, SP |
| I-50 | " | $=Z_1$ | SP, SP |

[Structure: bis-benzothiazole dye with Et bridge, Z1 and Z2 substituents, R1 and R2 on N+]

| Dye | $Z_1$ | $Z_2$ | $R_1, R_2$ [a] |
|---|---|---|---|

TABLE IV-continued

| Dye | | $Z_1$ | | |
|---|---|---|---|---|
| I-39 | 2-hydroxybenzamido group (OH, C(=O)-NH-) | $=Z_1$ | | SP, SP |
| I-51 | pyrrol-1-yl | $=Z_1$ | | SP, SP |
| I-52 | " | | Cl | SP, SP |

General structure: benzothiazole-methine-benzothiazole with $Z_1$, $Z_2$ substituents and $R_1$, $R_2$ on $N^+$ and N.

| Dye | $Z_1$ | $Z_2$ | $R_1, R_2{}^a$ |
|---|---|---|---|
| I-35 | 2-hydroxybenzamido group (OH, C(=O)-NH-) | Cl | SP, SP |
| I-53 | pyrrol-1-yl | Cl | SP, SP |

$^a$SE is 2-sulfoethyl, SP is 3-sulfopropyl, 3SB is 3-sulfobutyl, 4SB is 4-sulfobutyl.

The present invention is described further in the following Examples.

Synthesis Example 1

Synthesis of Dye I-23

Intermediate A 5-(2-Furancarboxamido)-2-methylbenzoxazole;

5-Amino-2-methylbenzoxazole (14.8 g, 0.100 mol) and 2,6-lutidine (12.0 g, 0.111 mol) were combined with 100 mL of tetrahydrofuran (THF) and the solution was cooled to 3° C. in an ice-bath under nitrogen. 2-Furoyl chloride (13.7 g, 0.105 mol) in 20 ml of THF was added dropwise so as to keep the temperature below 10° C. After addition the ice-bath was removed and after stirring for 1 hr the mixture was poured into 300 mL of water. The solid was collected and washed with water and dried. This afforded 21.1 g (87% yield) of product; m.p. 156°–158° C.

Intermediate B

Anhydro-5-(2-furancarboxamido)-2-methyl-3-(4-sulfobutyl)benzoxazoliumhydroxide 5-(2-Furancarboxamido)- 2-methylbenzoxazole (5.0 g, 0.021 mol) was combined with 1,4-butanesultone (3.0 mL, 0.029 mol) and 5 mL of butyronitrile and heated at reflux for 21 hrs. The solid formed was collected and washed with acetone and dried (4.1 g, 52% yield).

Preparation of Anhydro-5-chloro-9-ethyl-5'-(2-furancarboxamido)-3'-(4-sulfobutyl)-3-(3-sulfopropyl)oxacarbocyanine triethylammonium salt (Dye I-23)

Anhydro-5-(2-furancarboxamido)-2-methyl-3-(4-sulfobutyl)benzoxazoliumhydroxide (2.5 g, 6.65 mmol) was combined with anhydro-5-chloro-2-(2-ethoxybutenyl) 3-(3-sulfopropyl)benzoxazoliumhydroxide (2.5 g, 6.68 mmol) and 20 mL of m-cresol and heated to 127° C. Triethylamine (5 mL) was added and the mixture was heated for 5 min. with stirring. The mixture was removed from the heat, chilled in an ice-bath, and diluted with ether. The orange oil that formed was dissolved in 50 mL of ethanol and potassium acetate (2.5 g) was added. The product precipitated and was collected. The dye was purified by treatment with hot methanol and then by dissolving it in m-cresol and methanol and re-precipitating it by adding acetone. This afforded 580 mg (12% yield) of dye; 1-max =502 nm (MeOH), $\epsilon$-Max $=14.5\times10^4$.

Anal Calcd for: $C_{31}H_{31}ClO_{10}N_3S_2K$-1.5 $H_2O$: C, 48.23; H, 4.41; N, 5.44. Found: C, 48.21; H, 4.39; N, 5.37.

Synthesis Example 2

Synthesis of Dye I-43

Intermediate C 5-(pyrrol-1-yl)-2-methylbenzoxazole

5-Amino-2-methylbenzoxazole (30.0 g, 0,203 mol) and 2,5-dimethoxytetrahydrofuran (30.0 g, 0.227 mol) were combined with 90 mL of acetic acid and the solution was heated at reflux for 1 hr. The mixture was evaporated to a red slurry and mixed with hexane to give a dark solid. The solid was dissolved in methylene chloride and extracted with basic water. The organic phase was removed, dried, and evaporated to a brown solid. Recrystallization from hexane/heptane afforded 18 g (45% yield) of product, m.p. 115°–121° C.

Anal. Calcd for $C_{12}H_{10}N_2O$: C, 72.72; H, 5.08; N, 14.13. Found: C, 72.51; H, 4.97; N, 14.03.

Intermediate D:
Anhydro-5-(pyrrol-1-yl)-2-methyl-3-(3-sulfopropyl) benzoxazolium hydroxide 5-(Pyrrol-1-yl)- 2-methylbenzoxazole (2.0 g, 0.01 mol) was combined with 1,3-propanesultone (1.81 g, 0.015 mol) and 1.5 mL of valeronitrile and heated at 138° C. for 2 hrs. The solid formed was collected and washed with acetone and dried (3.0 g, 94% yield).

Anal. Calcd for $C_{15}H_{16}N_2SO4$: C, 54.65; H, 5.16; N, 8.50. Found: C, 54.93; H, 4.81; N, 8.46.

Preparation of Anhydro-5-chloro-9-ethyl-5'-(pyrrol-1-yl)-3,3'-di(3-sulfopropyl)oxacarbocyanine hydroxide potassium salt (Dye I-43)

Anhydro-5-(pyrrol-1-yl)-2-methyl- 3-(3-sulfopropyl)benzoxazoliumhydroxide (3.2 g, 10 mmol) was combined with anhydro-5-chloro-2-(2-ethoxybutenyl)- 3-(3-sulfopropyl)benzoxazolium hydroxide (3.8 g, 10 mmol), 10 mL of m-cresol and triethylamine (5 mL) and heated at 95° C. for 30 min. The mixture was removed from the heat, chilled in an ice-bath, and diluted with ether. The orange oil that formed was dissolved in 400 mL of methanol and potassium acetate (5.0 g) was added. The product precipitated and was collected. The dye was purified by recrystallization from pyridine/water and then recrystallization from propionic acid, followed by recrystallization from acetic acid. This afforded 300 mg (4% yield) of dye; λ-max=501 nm (MeOH), ε-Max =14.3×10$^4$.

Anal Calcd for: $C_{29}H_{29}C_1N_3O_8S_2K$-2.0 $H_{20}$: C, 48.18; H, 4.57; N, 5.82. Found: C, 48.36; H, 4.14; N, 5.83.

Synthesis Example 3

Synthesis of Dye I-47

Intermediate E 5-(Furan-2-yl)-2-methylbenzoxazole

5-Amino-2-methylbenzoxazole (7.0 g, 0.05 mole), isopentyl nitrite (20 mL), and furan (230 mL) were combined and heated with stirring at 30° C. in a roundbottom flask equipped with a condenser. After heating for 48 hrs, the reaction mixture was removed from the heat, washed with water, and then evaporated to an oil. Distillation afforded the product (4.0 g, 43% yield), bp 130°–140° C. (0.6 mm). Recrystallization from isopropyl alcohol (14 mL) afforded 3.0 g (32% yield), mp 60° C.

Intermediate F

Anhydro-5-(furan-2-yl)-2-methyl-3-(3-sulfopropyl) benzoxazolium hydroxide 5-(Furan-2-yl)-2-methylbenzoxazole (40.0 g, 0.2 mol) was combined with 1,3-propanesultone (25 g, 0.2 mole) and butyronitrile (100 mL) and heated at reflux for 18 hrs. The mixture was cooled to 25° C. and the product was collected and washed with butyronitrile and then ether. This afforded 55 g (86% yield) of D.

Preparation of
Anhydro-5-chloro-9-ethyl-5'-(furan-2-yl)-
3,3'-di(3-sulfopropyl)oxacarbocyanine hydroxide
potassium salt (Dye I-47)

Anhydro-5-(furan-2-yl) -2-methyl- 3-(3-sulfopropyl) benzoxazolium hydroxide (3.2 g, 10 mmol) was combined with anhydro-5-chloro-2-(2-ethoxybutenyl)- 3-(3-sulfopropyl)benzoxazolium hydroxide (4.0 g, 11 mmol), 20 mL of acetonitrile, and triethylamine (3 mL) and heated at reflux for 3 min. The mixture was cooled and then diluted with ether to give an orange oil. The ether was decanted; the oil was dissolved in pyridine (20 mL) and potassium acetate (1.0 g) in water (5 mL) was added. After heating to reflux, the mixture was cooled to 25° C. and the solid was collected. Recrystallization from pyridine/water, followed by a second recrystallization from acetic acid afforded the product (0.45 g, 7% yield), λ-max =503 nm (MeOH), ε-max =15.71×10$^4$.

Anal Calcd for: $C_{29}H_{28}ClN_2O_9S_2K$-2.0 $H_2O$: C, 48.16; H, 4.46; N, 3.87. Found: C, 47.93; H, 3.90; N, 3.81.

Photographic Evaluation Example 1

Black and white photographic materials

Black and white photographic materials were prepared by coating a polyester support with a silver halide emulsion layer containing chemically-sensitized 0.2 cubic silver bromoiodide (2.6 mol % I) at 10.8 mg Ag/dm$^2$, hardened gelatin at 73 mg/dm$^2$, and sensitizing dye as identified in the Table III at 0.8 mmole/mole Ag. The elements were given a wedge spectral exposure and processed in RP X-OMAT chemistry (a developer containing hydroquinone and p-methylaminophenol as developing agents).

The photographic speed of the dyes is reported (Table VI) in terms of a sensitizing ratio (SR), which is defined as the speed at λ-max (in log E units multipliedby 100) minus the intrinsic speed of the dyed emulsion at 400 nm (in log E units multiplied by 100) plus 200. This measurement of speed allows for comparison while using a uniform chemical sensitization that is not optimized for each sensitizing dye.

Black and white stain was measured by processing unexposed film and placing the processed film in front of a scanning spectrophotometer. The total transmission was measured between 500 and 900 nm. This data was plotted as absorbance (-log I/T). The stain was calculated as the maximum absorbance at any wavelength in the range 400–900 nm (Table VII).

Photographic Evaluation Example 2

Color photographic materials

Color photographic materials were prepared by coating a polyester support with a silver halide emulsion layer containing chemically-sensitized 0.7 µm (equivalent circular diameter) polymorphic silver bromoiodide (6 mole % I) at 16 mg Ag/dm$^2$, hardened gelatin at 63 mg/dm$^2$, 4-hydroxy-6-methyl-1,3,3a,7-tetraazaindene antifoggant at 5 mg/dm$^2$, N-[4-[2,4-bis(1,1-dimethylpropyl)phenoxy] butyl]-1-hydroxy-2-naphthalenecarboxamide coupler at 14 mg/dm$^2$, di-nbutylphthalate (8 mg/dm$^2$) and sensitizing dye as identified in Table VIII at 0.4 mmole/mole Ag. The elements were given a wedge spectral exposure and coatings were processed in Kodak C-41® processing. The photographic speed of the dyes is reported in terms of a sensitizing ratio (SR) and λmax was determined from absorptance measurements.

Color stain was obtained by processing unexposed color coatings for 3.5 minutes at 33° C. in the processing solution described below, followed by 1.15 minutes in a bleach-fix solution, and then a 3.5 minute wash. Stain was measured by placing the processed film in front of a scanning spectrophotometer. The stain was calculated as the maximum absorbance at any wavelength in the range 400–900 nm (Table VIII).

| Processing Solution | |
|---|---|
| Benzyl alcohol | 14.2 mL |
| Potassium carbonate | 28 g |
| 45% Potassium sulfite | 2.75 mL |
| Triethanolamine | 11 mL |
| Hydroxylamine sulfate | 3.2 g |
| Potassium bromide | 0.58 g |
| Potassium chloride | 0.13 g |
| Lithium chloride | 0.13 g |
| Anticalcium agent | 0.8 mL |
| Water to make | 1.0 L |
| pH adjusted to | 10.08 |

All the dyes effectively sensitized the silver halide emulsions in which they were used. Comparison dyes are shown below.

TABLE V

Comparison Dye Structures

| Dye | $Z_1$ | $Z_2$ | $R_1, R_2$[a] |
|---|---|---|---|
| C-1 | phenyl | Cl | 3SB, SP |
| C-2 | " | F | SP, SP |
| C-3 | " | =$Z_1$ | 3SB, 3SB |
| C-4 | " | =$Z_1$ | SE, SE |
| C-5 | " | MeC(O)—NH— | SP, SP |
| C-6 | " | " | Et, SP |
| C-7 | MeC(O)—NH— | =$Z_1$ | SP, SP |
| C-8 | thienyl | Cl | SP, SP |
| C-9 | (dimethyl maleimide-N) | =$Z_1$ | SP, SP |
| C-10 | phenyl | =$Z_1$ | SP, SP |
| C-11 | phenyl | Cl | SP, SP |

[a]SE is 2-sulfoethyl, SP is 3-sulfopropyl, 3SB is 3-sulfobutyl, 4SB is 4-sulfobutyl.

TABLE VI

Dye Speed in the B&W Format*

| Dye | λmax | SR | Dye | λmax | SR |
|---|---|---|---|---|---|
| C-1 | 547 | 250 | C-2 | 538 | 235 |
| I-1 | 542 | 249 | I-3 | 537 | 238 |
| I-2 | 541 | 243 | I-4 | 540 | 240 |
| I-6 | 530 | 229 | I-9 | 542 | 229 |
| I-7 | 538 | 236 | I-10 | 530 | 231 |
| I-8 | 546 | 242 | I-14 | 527 | 222 |
| I-13 | 541 | 238 | I-18 | 542 | 241 |
| I-16 | 541 | 247 | I-26 | 543 | 241 |
| I-20 | 541 | 237 | I-27 | 535 | 231 |
| I-21 | 546 | 249 | I-33 | 537 | 242 |
| I-23 | 547 | 248 | I-44 | 541 | 250 |
| I-24 | 545 | 245 | I-49 | 546 | 248 |
| I-31 | 548 | 247 | C-4 | 547 | 244 |
| I-32 | 546 | 249 | I-5 | 539 | 236 |
| I-37 | 541 | 263 | I-11 | 492 | 232 |
| I-38 | 544 | 254 | I-15 | 543 | 247 |
| I-43 | 550 | 255 | I-19 | 539 | 244 |
| I-47 | 554 | 257 | I-22 | 495 | 231 |
|  |  |  | I-29 | 545 | 244 |
| I-12 | 547 | 249 | C-5 | 541 | 241 |
| I-17 | 542 | 242 | C-6 | 548 | 247 |
| I-30 | 546 | 257 | C-3 | 545 | 245 |
| I-34 | 546 | 254 | C-9 | 520 | 128 |
| I-35 | 465 | 225 | I-41 | 537 | 239 |
| I-36 | 546 | 249 | I-42 | 542 | 229 |
|  |  |  | I-50 | 559 | 253 |

*Data are from various coating sets.

TABLE VII

Dye Stain in the B&W Format*

| Dye | λmax | OD × 10³ | Dye | λmax | OD × 10³ |
|---|---|---|---|---|---|
| C-1 | 508 | 48 | I-4 | 505 | 42 |
| I-1 | 510 | 41 | I-9 | 508 | 46 |
|  | 543 | 31 |  |  |  |
| I-2 | 510 | 41 | I-10 | 508 | 50 |
|  | 550 | 61 |  |  |  |
| I-6 | 510 | 47 | I-14 | 505 | 44 |
| I-7 | 508 | 51 | I-18 | 508 | 39 |
| I-8 | 508 | 50 | I-26 | 508 | 38 |
| I-13 | 508 | 47 | I-27 | 508 | 40 |
| I-16 | 508 | 32 | I-33 | 508 | 30 |
|  | 540 | 42 |  |  |  |
| I-20 | 490 | 27 | I-44 | 505 | 30 |
|  | 510 | 30 |  |  |  |
| I-21 | 510 | 64 | I-49 | 510 | 36 |
|  | 543 | 88 |  |  |  |
| I-23 | 510 | 41 | I-46 | 518 | 38 |
| I-24 | 508 | 46 | C-4 | 505 | 32 |
|  | 550 | 41 |  | 540 | 17 |
| I-31 | 510 | 24 | I-5 | 540 | 91 |
|  | 540 | 20 |  | 510 | 71 |
| I-32 | 510 | 47 | I-11 | 500 | 84 |
|  | 490 | 35 |  | 525 | 78 |
| I-43 | 510 | 36 | I-15 | 485 | 30 |
|  |  |  |  | 510 | 36 |
| I-47 | 510 | 39 | I-19 | 540 | >100 |
| I-48 | 510 | 36 | I-22 | 490 | 50 |
|  |  |  |  | 510 | 45 |

TABLE VII-continued

Dye Stain in the B&W Format*

| Dye | λmax | OD × 10³ | Dye | λmax | OD × 10³ |
|---|---|---|---|---|---|
| C-2 | 504 | 48 | I-29 | 512 | 57 |
| I-3 | 510 | 36 | C-9 | 505 | 29 |

*Data are from various coating sets.

TABLE VIII

Dye Speed and Stain in the Color Format*

| | Sensitization | | | Stain | |
|---|---|---|---|---|---|
| | λmax | Speed | SR | λmax | OD × 10³ |
| C-1 | 550 | 197 | 233 | 510 | 37 |
| I-2 | 540 | 179 | 224 | 510 | 12 |
| I-8 | 550 | 192 | 226 | 510 | 13 |
| I-16 | 550 | 199 | 220 | 510 | 10 |
| I-24 | 540 | 180 | 214 | 510 | 3 |
| I-32 | 550 | 193 | 227 | 510 | 7 |
| I-37 | 540 | 188 | 228 | 505 | 12 |
| C-8# | 550 | | 226 | 512 | 38 |
| I-43# | 550 | | 238 | 510 | 22 |
| I-47# | 560 | | 225 | 512 | 35 |
| | | | | 560 | 19 |
| C-2 | 540 | 188 | 223 | 508 | 19 |
| I-3 | 540 | 192 | 218 | 510 | 5 |
| I-14 | 540 | 176 | 209 | 508 | 8 |
| I-26 | 540 | 185 | 212 | 510 | 2 |
| I-44# | 540 | | 224 | 510 | 13 |
| I-49# | 550 | | 221 | 510 | 15 |
| C-4 | 550 | 197 | 240 | 512 | 50 |
| | | | | 545 | 17 |
| I-29 | 550 | 194 | 223 | 515 | 4 |
| C-3 | 550 | 186 | 233 | 512 | 46 |
| | | | | 550 | 105 |
| I-8 | 540 | 191 | 219 | 510 | 44 |
| | | | | 545 | 89 |
| I-15 | 540 | 157 | 211 | 510 | 9 |
| I-50# | 560 | | 240 | 550 | >100 |
| C-10 | 630 | 142 | 189 | 582 | 65 |
| I-39 | 550 | 114 | 151 | 580 | 18 |
| C-11 | 470 | 186 | 223 | 465 | 68 |
| I-35 | 470 | 191 | 219 | 465 | 34 |
| C-7 | — | — | 204 | — | 0 |
| C-5 | 550 | 190 | 221 | 512 | 24 |
| C-6 | 550 | | 223 | 512 | 53 |

*Data are from two coatings sets; the dyes marked with # were in one set, the remaining dyes were in the other set.

The data presented in Tables IV–VIII indicate that the dyes used according to the invention provided effective spectral sensitization and gave significantly lower post-processing stain than the comparison dyes, particularly in the color format. Comparison dyes with hydrophilic substituents, which did not contain an aromatic group (for example, Dye C-7) or had an aromatic group with α substituents (for example, Dye C-9), are low in stain but gave poor sensitization.

While particular embodiments of the present invention have been described above, it will be understood that variations and modifications can be effected within the spirit and scope of the invention.

What is claimed is:

1. A silver halide photographic element comprising a negative working silver halide emulsion the grains of which form latent images primarily on the surface, the silver halide emulsion sensitized with a sensitizing dye of the formula:

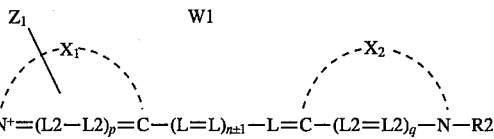

wherein:

$X_1$ and $X_2$ each independently represents the atoms necessary to complete a 5- or 6-membered heterocyclic nucleus, wherein $X_1$ may be further substituted and $X_2$ may be substituted or unsubstituted;

n is a positive integer from 1 to 4;

p and q each independently represents 0 or 1, each L and L2 independently represents a substituted or unsubstituted methine group, $R_1$ and $R_2$ each independently represents a substituted aryl or substituted aliphatic group both of $R_1$ and $R_2$ being substituted with an acid or acid salt group;

$Z_1$ represents Ar1-(L1)$_m$, where Ar1 is a substituted or unsubstituted aromatic group, L1 is a linking group of no more than 2 atoms in sequence linking Ar1 with $Z_1$, m is 0 or 1, and the LOGP(A) of a molecule having a structure A corresponding to a portion of the dye structure A

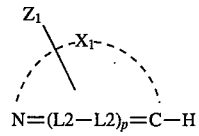

is no more than 70% of LOGP(A'), where A' is the same as A except $Z_1$ is replaced with unsubstituted phenyl, provided that L1 is not —CO— when $X_1$ or $X_2$ is S or Se; and W1 is a counterion as needed to balance the charge of the molecule.

2. A silver halide photographic element according to claim 1 wherein the LOGP(A) is no more than 60% of LOGP(A').

3. A silver halide photographic element according to claim 1 wherein $X_1$ and $X_2$ each represent the atoms necessary to complete an oxazole ring which may be further substituted in the case of $X_1$ and substituted or unsubstituted in the case of $X_2$.

4. A silver halide photographic element according to claim 1 wherein any further substituent on $X_1$ or any substituent on $X_2$ is non-aromatic.

5. A silver halide photographic element according to claim 4 wherein:

[LOGP(A')−LOGP(A)]+[LOGP(B')−LOGP(B)]≧−0.55 in which LOGP(B) is the LOGP of a molecule having a structure B corresponding to a portion of the dye:

structure B

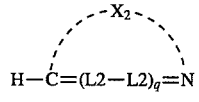

and B' is the same as B except any substituents on $X_2$ in B are not present in B'.

6. A silver halide photographic element according to claim 1 wherein the sensitizing dye is of the formula:

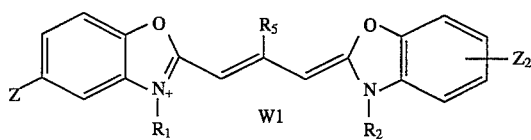

wherein $R_5$ is H or a substituted or unsubstituted lower alkyl and $Z_2$ is H or a non-aromatic substituent.

7. A silver halide photographic element according to claim 6 wherein the LOGP(A) is no more than 60% of the LOGP(A').

8. A silver halide photographic element according to claim 6 wherein:

[LOGP(A')–LOGP(A)]+[LOGP(B')–LOGP(B)]≧–0.55 wherein LOGP(B) is the LOGP of a molecule having a structure B corresponding to a portion of the dye:

structure B

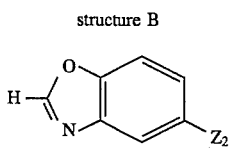

and B' is the same as B except any substituents on the benzo ring in B are not present in B'.

9. A silver halide photographic element according to claim 6 wherein when m=0 then $Z_1$ does not have any substituent in the α position to the point of attachment of $Z_1$ to the benzene ring shown.

10. A silver halide photographic element according to claim 6 additionally comprising a dispersion of a water-immiscible solvent into which the sensitizing dye can migrate.

11. A silver halide photographic element according to claim 6 additionally comprising a dispersion of a water-immiscible solvent carrying a color coupler.

12. A silver halide photographic element according to claim 6 wherein the LOGP(A) of structure A is no more than 50% of the LOGP(A').

13. A silver halide photographic element according to claim 6 wherein the silver halide emulsion is a tabular grain emulsion wherein at least 50% of the grain population is accounted for by tabular grains that have a thickness of less than 0.5μm and which satisfy the formula ECD/$t^2$>25, wherein ECD represents the average equivalent circular diameter of the tabular grains in micrometers, and t represents the average thickness of the grains in micrometers.

14. A photographic element according to claim 6, wherein the silver halide emulsion comprises at least 95 mole percent silver chloride.

15. A silver halide photographic element according to claim 1 additionally comprising a dispersion of a water-immiscible solvent into which the sensitizing dye can migrate.

16. A silver halide photographic element according to claim 1 additionally comprising a dispersion of a water-immiscible solvent carrying a color coupler.

17. A silver halide photographic element comprising a negative working silver halide emulsion the grains of which form latent images primarily on the surface, the emulsion being sensitized with a sensitizing dye of the formula:

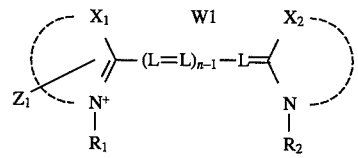

wherein:

$X_1$ and $X_2$ independently represent the atoms necessary to complete a benzothiazole nucleus, benzoxazole nucleus, benzotellurazole nucleus, quinoline nucleus, or benzimidazole nucleus in which $X_1$ may be further substituted and $X_2$ may be substituted or unsubstituted;

n is a positive integer from 1 to 4, each L independently represents a substituted or unsubstituted methine group, $R_1$ and $R_2$ each independently represents a substituted aryl or substituted aliphatic group, both of $R_1$ and $R_2$ being substituted with an acid or acid salt group;

$Z_1$ represents Ar1-(L1)$_m$, where Ar1 is a substituted or unsubstituted aromatic group, L1 is a linking group of no more than 2 atoms in sequence linking Ar1 with $Z_1$, m is 0 or 1, and the LOGP(A) of a molecule having a structure A corresponding to a portion of the dye structure A

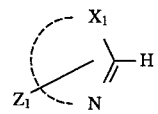

is no more than 80% of LOGP(A'), where A' is the same as A except $Z_1$ is replaced with unsubstituted phenyl, provided that L1 is not —CO— if $X_1$ or $X_2$ is S or Se; and W1 is a counterion as needed to balance the charge of the molecule.

18. A silver halide photographic element according to claim 12 wherein the LOGP(A) is no more than 60% of LOGP(A').

19. A silver halide photographic element according to claim 12 wherein any further substituent on $X_1$ and any substituent on $X_2$ are non-aromatic.

20. A silver halide photographic element according to claim 19 wherein the LOGP(A) is no more than 60% LOGP(A').

21. A silver halide photographic element according to claim 19 wherein when m=0 then $Z_1$ does not have any substituent in the α position to the point of attachment of $Z_1$ to $X_1$.

22. A silver halide photographic element according to claim 21 wherein:

LOGP(A')–LOGP(A)]+[LOGP(B')–LOGP(B)]≧–0.55 in which LOGP(B) is the LOGP of a molecule having a structure B corresponding to a portion of the dye:

structure B

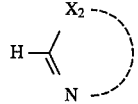

and B' is the same as B except any substituents on $X_2$ in B are not present in B'.

23. A silver halide photographic element according to claim 12 additionally comprising a dispersion of a water-immiscible solvent into which the sensitizing dye can migrate.

24. A silver halide photographic element according to claim 12 additionally comprising a dispersion of a water-immiscible solvent carrying a color coupler.

25. A silver halide photographic element comprising a negative working silver halide emulsion the grains of which form latent images primarily on the surface, the silver halide emulsion sensitized with a sensitizing dye of the formula:

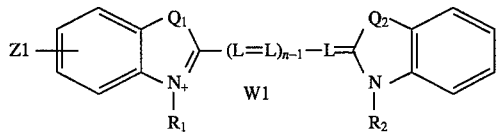

wherein:

$Q_1$ and $Q_2$ independently represent O, N, or S;

n is a positive integer from 1 to 4;

each L independently represents a substituted or unsubstituted methine group;

$R_1$ and $R_2$ each independently represents a substituted or unsubstituted aryl or substituted or unsubstituted aliphatic group;

$Z_1$ represents $[Ar1\text{-}(L1)m]Ar1\text{-}(L1)_m$, where Ar1 is a substituted or unsubstituted aromatic group, L1 is a linking group of no more than 2 atoms in sequence linking Ar1 with $Z_1$, m is 0 or 1, and the LOGP(A) of a molecule having a structure A corresponding to a portion of the dye structure A

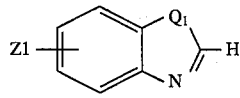

is no more than 80% of LOGP(A'), where A' is the same as A except $Z_1$ is replaced with unsubstituted phenyl, provided that L1 is not —CO— if Q1 or Q2 is S; and the benzene rings are optionally further substituted with non-aromatic substituents;

W1 is a counterion as needed to balance the charge of the molecule.

26. A silver halide photographic element according to claim 25 wherein the LOGP(A) is no more than 60%. of the LOGP(A').

27. A silver halide photographic element according to claim 25 wherein:

[LOGP(A')–LOGP(A)]+[LOGP(B')–LOGP(B) ]≧–0.55 in which LOGP(B) is the LOGP of a molecule having a structure B corresponding to a portion of the dye:

structure B

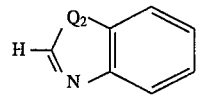

and B' is the same as B except any substituents on the benzo ring in B are not present in B'.

28. A silver halide photographic element according to claim 25 wherein the LOGP(A) is no more than 50% of the LOGP(A').

29. A silver halide photographic element according to claim 25 wherein when m=0 then $Z_1$ does not have any substituent in the α position to the point of attachment of $Z_1$ to the benzene ring shown.

30. A silver halide photographic element according to claim 25 additionally comprising a dispersion of a water-immiscible solvent into which the sensitizing dye can migrate.

31. A silver halide photographic element according to claim 25 additionally comprising a dispersion of a water-immiscible solvent carrying a color coupler.

* * * * *

UNITED STATES PATENT AND TRADEMARK OFFICE
CERTIFICATE OF CORRECTION

PATENT NO. : 5,492,802
DATED : February 20, 1996
INVENTOR(S) : Richard L. Parton et al.

It is certified that errors appear in the above-identified patent and that said Letters Patent is hereby corrected as shown below:

Column 28, Line 5,

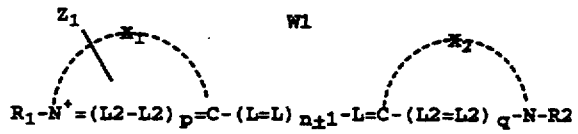

should read

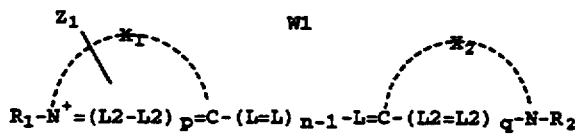

Column 28, Line 19, after "group" insert --,--.

Col. 28, Line 54, "[LOGP (A')-LOGP(A)]+[LOGP(B')- LOGP(B)] ≥ - 0.55" should read --[LOGP(A')-LOGP(A)]+[LOGP(B')-LOGP(B)]≥-0.55--

UNITED STATES PATENT AND TRADEMARK OFFICE
CERTIFICATE OF CORRECTION

PATENT NO. : 5,492,802
DATED : February 20, 1996
INVENTOR(S) : Richard L. Parton et al.

It is certified that errors appear in the above-identified patent and that said Letters Patent is hereby corrected as shown below:

Column 29, Line 5,

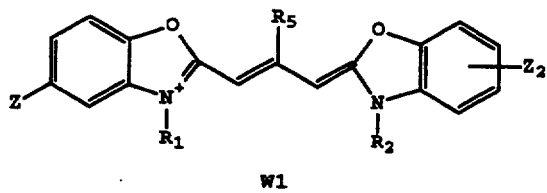

should read

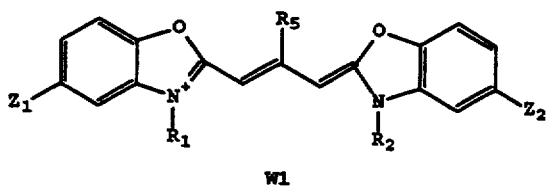

Column 29, Line 17, "[LOGP (A')-LOGP(A)]+[LOGP(B')- LOGP(B)] ≥ - 0.55" should read --[LOGP(A')-LOGP(A)]+[LOGP(B')-LOGP(B)]≥-0.55--

Column 30, Line 40, "12" should read --17--.

Column 30, Line 43, "12" should read --17--.

UNITED STATES PATENT AND TRADEMARK OFFICE
CERTIFICATE OF CORRECTION

PATENT NO. : 5,492,802
DATED : February 20, 1996
INVENTOR(S) : Richard L. Parton et al.

It is certified that errors appear in the above-identified patent and that said Letters Patent is hereby corrected as shown below:

Column 30, Line 55, "LOGP(A')-LOGP(A)]+[LOGP(B')-LOGP(B)]$\geq$-0.55" should read --[LOGP(A')-LOGP(A)]+[LOGP(B')-LOGP(B)]$\geq$-0.55--.

Column 31, Line 2, "12" should read --17--.

Column 31, Line 6, "12" should read --17--.

Column 31, Line 15,

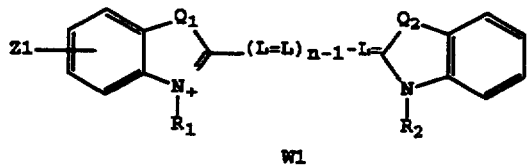

should read

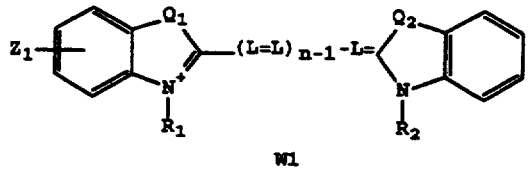

UNITED STATES PATENT AND TRADEMARK OFFICE
CERTIFICATE OF CORRECTION

PATENT NO.   : 5,492,802
DATED        : February 20, 1996
INVENTOR(S)  : Richard L. Parton et al.

It is certified that errors appear in the above-identified patent and that said Letters Patent is hereby corrected as shown below:

Column 31, Line 28, "[Ar1-(L1)m]Ar1-(L1)$_{m'}$" should read
--[Ar1-(L1)m]Ar1-(L1)$_{m'}$--.

Column 32, Line 8, "60%." should read --60%--.

Column 32, Line 13, "[LOGP(A')-LOGP(A)]+[LOGP(B')-LOGP(B) ]$\geq$-0.55" should read --[LOGP(A')-LOGP(A)]+[LOGP(B')-LOGP(B)]$\geq$-0.55--.

Signed and Sealed this

Twentieth Day of August, 1996

Attest:

BRUCE LEHMAN

*Attesting Officer*    *Commissioner of Patents and Trademarks*